(12) United States Patent
Chen et al.

(10) Patent No.: US 7,224,357 B2
(45) Date of Patent: May 29, 2007

(54) THREE-DIMENSIONAL MODELING BASED ON PHOTOGRAPHIC IMAGES

(75) Inventors: Qian Chen, San Diego, CA (US); Gerard Medioni, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 510 days.

(21) Appl. No.: 09/848,773

(22) Filed: May 3, 2001

(65) Prior Publication Data
US 2002/0024516 A1 Feb. 28, 2002

Related U.S. Application Data

(60) Provisional application No. 60/213,393, filed on Jun. 23, 2000, provisional application No. 60/201,585, filed on May 3, 2000.

(51) Int. Cl.
*G06T 17/00* (2006.01)

(52) U.S. Cl. ............ 345/420; 345/419; 345/423; 345/424; 345/427; 382/154; 382/226; 382/294

(58) Field of Classification Search ........ 345/424, 345/420, 421, 427, 426, 473, 423, 419, 422; 382/154, 294, 226; 600/407
See application file for complete search history.

(56) References Cited

U.S. PATENT DOCUMENTS

| | | | | |
|---|---|---|---|---|
| 5,748,199 A | * | 5/1998 | Palm | ............ 345/473 |
| 5,917,937 A | * | 6/1999 | Szeliski et al. | ............ 382/154 |
| 6,018,349 A | * | 1/2000 | Szeliski et al. | ............ 345/629 |
| 6,026,189 A | * | 2/2000 | Greenspan | ............ 382/226 |
| 6,061,468 A | * | 5/2000 | Kang | ............ 382/154 |
| 6,175,648 B1 | * | 1/2001 | Ayache et al. | ............ 382/154 |
| 6,456,737 B1 | * | 9/2002 | Woodfill et al. | ............ 382/154 |
| 6,477,268 B1 | * | 11/2002 | Chang et al. | ............ 382/154 |
| 6,571,024 B1 | * | 5/2003 | Sawhney et al. | ............ 382/294 |
| 6,591,004 B1 | * | 7/2003 | VanEssen et al. | ............ 382/154 |
| 6,606,406 B1 | * | 8/2003 | Zhang et al. | ............ 382/154 |
| 6,608,923 B1 | * | 8/2003 | Zhang et al. | ............ 382/154 |

OTHER PUBLICATIONS

Hartley et al. "Stereo from Uncalibrated Cameras", IEEE, 1992, pp. 761-764.*
Peter Burt & Bela Julesz, *Modifications of the Classical Notion of Panum's Fusional Area*, PERCEPTION, 1980, vol. 9, No. 6, pp. 671-682.
Ingemar J. Cox et al., *A Maximum Likelihood Stereo Algorithm*, Computer Vision and Image Understanding, May 1996, vol. 63, No. 3, pp. 542-567.
Umesh R. Dhond & J.K. Aggarwal, *Structure from Stereo-A Review*, IEEE Transactions on Systems, Man and Cybernetics, Nov./Dec. 1989, vol. 19 No. 6, pp. 1489-1510.

(Continued)

*Primary Examiner*—Kimbinh T. Nguyen
(74) *Attorney, Agent, or Firm*—Fish & Richardson, P.C.

(57) ABSTRACT

A system of determining three-dimensional information from the information that is contained into discrete two-dimensional images. The two images may be obtained from two uncalibrated cameras. The information from the two uncalibrated cameras is first rectified, and then used to form a disparity surface indicating the third dimensional information. Various techniques are used to increase the speed of conversion.

35 Claims, 4 Drawing Sheets

OTHER PUBLICATIONS

William Hoff & Narendra Ahuja, *Surface form Stereo: Integrating Feature Matching, Disparity Estimation, and Contour Detection*, IEEE Transactions on Pattern Analysis and Machine Inteligence, Feb. 1989, vol. 11, No. 2, pp. 121-136.

Conrad J. Poelman & Takeo Kanade, *A Paraperspective Factorization Method for Shape and Motion Recovery*, IEEE Transactions on Pattern Analysis and Machine Intelligence, Mar. 1997, vol. 19, No. 3, pp. 206-218.

Horace H.S.Ip & Lijun Yin, *Constructing a 3D Individualized Head Model From Two Orthogonal Views*, The Visual Computer, 1996, vol. 12, No. 5, pp. 254-266.

Brian Guenter et al., *Making Faces*, Computer Graphics Proceedings, Annual Conference Series 1998, pp. 55-66.

Frederic Pighin et al., *Synthesizing Realistic Facial Expressions From Photographs*, Computer Graphics Proceedings, Annual Conference Series 1998, pp. 75-84.

* cited by examiner

THREE-DIMENSIONAL MODELING BASED ON PHOTOGRAPHIC IMAGES

CROSS REFERENCE TO RELATED APPLICATIONS

This application claims the benefit of the U.S. Provisional Application Ser. No. 60/201,585, filed May 3, 2000, and U.S. Provisional Application Ser No. 60/213,393, filed Jun. 23, 2000.

BACKGROUND

Many different applications exist for three-dimensional imaging. While many current image-viewing media, such as display screens and photographs, display only in two dimensions, the information from the third dimension may still be useful, even in such two-dimensional displays.

For example, teleconferencing may be used to allow several geographically separate participants to be brought into a single virtual environment. Three dimensional information may be used in such teleconferencing, to provide realism and an ability to modify the displayed information, to accommodate facial movement.

Facial orientation and expression may be used to drive models over the network to produce and enhance the realism.

Three-dimensional information may also be usable over a network, using, for example, the concept of cyber touch. Those people browsing the web page of a certain server such as a museum may be allowed to touch certain objects using a haptic device. One such device is available at http://digimuse.usc.edu/IAM.htm.

Work along this line has been carried out under the names aerial triangulation, and binocular stereo.

Three-dimensional models may be obtained using a laser scanner. Other techniques are also known for obtaining the three-dimensional models. Practical limitations, however, such as cost, complexity, and delays may hamper obtaining an accurate three-dimensional model.

If two cameras are completely calibrated, then obtaining a full 3D model from 2D information is known. See the book "Multiple View Geometry in Computer Vision", Richard Hartley and Andrew Zisserman, Cambridge University Press, June 2000. Calibration of cameras includes internal calibration and external calibration. Internal calibration refers to the characteristic parameters of the camera such as focal length, optical center, distortion, skew, . . . External parameters which describe the relative position and orientation of the cameras with respect to each other. It is known to go to 3D from a disparity map if cameras are both internally and externally calibrated.

Internal calibration of cameras is a well understood problem in the literature, with packages freely available to perform this step. Intel's OpenCV Library at http://www.intel.com/research/mrl/research/opencv/, for example, can be used. These techniques such as these may be used to internally calibrate the cameras offline. However, the present system does not require calibration.

SUMMARY

The present application teaches a technique of processing two-dimensional images such as photographs to obtain three-dimensional information from the two-dimensional photographs. Different aspects of the invention describe the ways in which multiple images are processed to obtain the three-dimensional information therefrom.

According to one aspect, the images are modified in a way that avoids the necessity to calibrate among the cameras.

BRIEF DESCRIPTION OF THE DRAWINGS

These and other aspects will now be described in detail with reference to the accompanying drawings, wherein.

DETAILED DESCRIPTION

The binocular stereo technique used according to the present system may find three-dimensional information from two or more pictures taken from close locations. This system may find image portions, e.g. pixels, between the images that correspond. Rays from the two pixels are used to form a simulated three-dimensional location of a point on the 3-D item. All recovered three-dimensional points may then be connected to form a polygonal mesh representing aspects of the 3D shape of the object. The three-dimensional object may create photorealistic images at arbitrary viewpoints. These images may be useful for telepresence, in which several geographically separated participants may be brought into one virtual environment. Three-dimensional information may allow production of face models at remote sites, for example may be driven at arbitrary orientations.

The inventors have recognized a number of problems which exist in forming three-dimensional information based on similarity peaks between the different information. In addition, previous systems have caused false matches, thereby showing an irregularity in the final model. Previous systems have also required that either the cameras be calibrated, or certain extra mathematical steps be followed to ensure that the uncalibrated cameras do not cause false results.

One aspect of the present system uses a semi automatic approach to address limitations in the prior art. Computer vision techniques may be used with a semi-automatic approach. Manual techniques may be used for initialization and to determine parts of the reconstruction that are acceptable and other parts that are not.

Figure 1:
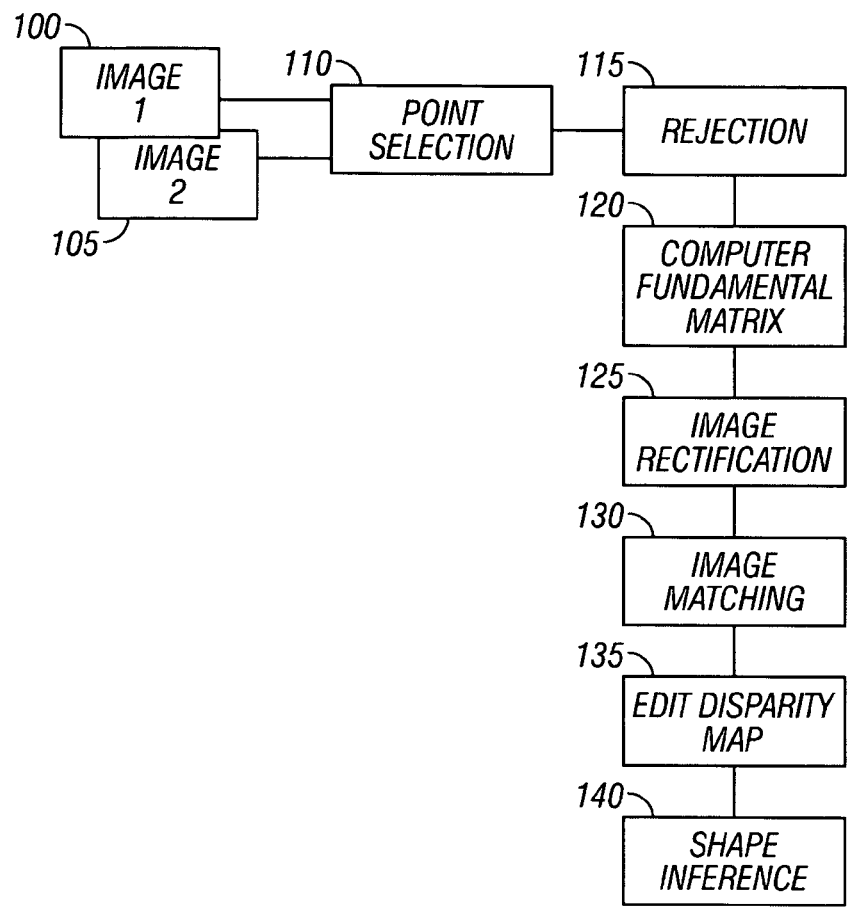
FIG. 1 shows a system flowchart.
Figure 2:
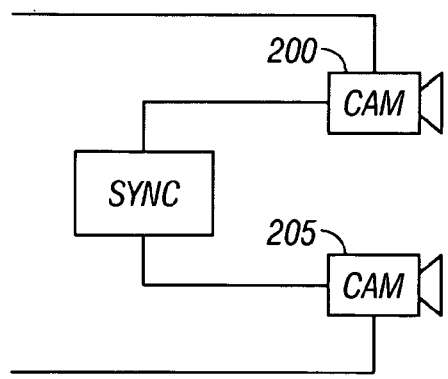
FIG. 2 shows a hardware block diagram.

The basic operation is shown in the overall flowchart of FIG. 1. The FIG. 1 flowchart may be carried out on any machine which is capable of processing information and obtaining vision type information. An exemplary hardware system is shown in FIG. 2. The FIG. 2 embodiment shows use of two cameras 200, 205. The two cameras may be Fuji model DS-300 cameras. A synchronizing device 210 provides synchronization such that the cameras are actuated at substantially the same time. However, synchronization need not be used if the subject stays relatively still.

In another embodiment, the same camera is used to obtain two images that are offset from one another by some small amount, e.g., less than 15 degrees.

The camera outputs may be colored images with 640 by 480 resolution. Color is not in fact necessary, and may be used only in the texture mapping part of the applications. The images are input into the system as a pair of stereo images 100, 105. The stereo images are preferably images of the same scene from slightly different angles.

Alternate embodiments may use other digital cameras, such as cameras connected by USB or Firewire, and can include analog or video cameras. Other resolutions, such as 320×240 and 1600×1200 may also be used.

Manual selection is used to allow the user to select specified corresponding points in the two images at 110. The locations of those manually-selected corresponding points are then refined using automatic methods. Moreover, the system may reject selected points, if those selected points do not appropriately match, at 115.

Alternatively, the system may use a totally automatic system with feature points and robust matching, as described by Zhang et al, or Medioni-Tang [C.-K. Tang, G. Medioni and M.-S. Lee, "Epipolar Geometry Estimation by Tensor Voting in 8D," in Proc. IEEE International Conference on Computer Vision (ICCV), Corfu, Greece, September 1999].

At 120, the system computes the "fundamental matrix" based on this manual input. The fundamental matrix is well known in the art as a Rank 2, 3×3 matrix that describes information about images in epipolar geometry.

An alternative may allow automatic establishing of correspondence if high entropy parts are included in the image. For example, if the image has high-intensity curvature points such as eye corners of a human face, then these points may be used to automatically establish correspondence.

The fundamental matrix at 120 may be used to automatically align the two images to a common image plane. The aligned images are automatically matched.

125 represents carrying out image rectification. In general, the two cameras 200, 205 that are used to generate the stereo images 100, 105 are not parallel. Rectification is used to align the two image planes from the two cameras 200, 205. This effectively changes the numerical representation of the two images so that the two stereo images become coplanar and have scan lines that are horizontally parallel.

The system used according to the present technique may rely on epipolar geometry, as described herein. This geometry is between two views of the same scene and is algebraically described by the fundamental matrix.

The image space is treated as a two-dimensional projective space $P^2$ which has certain properties. In this space, points and lines become dual entities. For any projective result established using these points and lines, a symmetrical result holds. In this result, the roles of the lines and points are interchanged. Points may become lines, and lines may become points in this space.

Figure 3A:
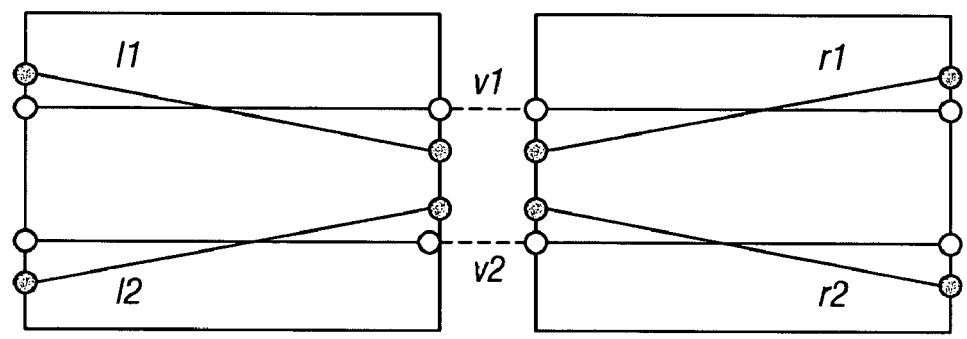
FIGS. 3a and 3b show illustrations of epipolar geometry.
Figure 3B:
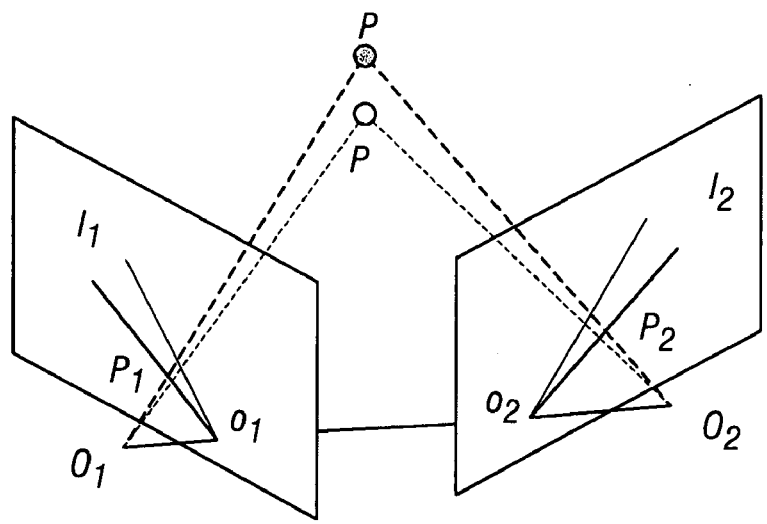

Graphically, epipolar geometry is depicted in FIG. 3B where P, P' are 3-D scene points; $p_1$, $p_2$ are images of P. $O_1$, $O_2$ are camera projection centers. The line $O_1O_2$ is called the baseline. Notice that the two triangles $\Delta O_1 O_2 P$ and $\Delta O_1 O_2 P'$ are coming from a pencil-of-planes which is projected to the pencil-of-lines in the image planes. The latter (e.g. $l_1$ and $l_2$) form epipolar lines. The intersection of each pencil-of-lines is called the epipole ($o_1$, $o_2$). An epipole has many interesting characteristics. It is the intersection of all the epipolar lines, and it is also the intersection of the baseline with the image plane. It is also the projection of a camera projection center on the counterpart image plane. It is observable from that if an image plane is parallel to the baseline, then its epipole is at infinity and then all epipolar lines on that image plane become parallel.

Algebraically, epipolar geometry is described by the following equation:

$$p_2^T F p_1 = 0$$

where F is the fundamental matrix, e.g. a 3×3 rank 2 matrix and $p_1$ and $p_2$ are the 3-tuple homogeneous coordinates of corresponding pixel points. $p_1$ is located on the epipolar line defined by $p_2^T F$. The relationship is symmetric: $p_2$ is on the line defined by $p_1^T F^T$. Since $o_1^T F^T p_2 = 0$ for any $p_2$, $O f_1 = 0$. Thus $o_1$ is the null vector of F which reflects the fact that F is of rank 2. Similarly, $o_2$ is the null vector of $F^T$. It is observable from that if an image plane is parallel to the baseline, then its epipole is at infinity and then all epipolar lines on that image plane become parallel.

A rectification transformation over an image plane may be represented by a 3×3 matrix with eight independent coefficients ignoring a scale factor. This may require at least 4 correspondences to compute a rectification transformation.

A transformation may be represented by a 3×3 matrix with eight independent coefficients and a scale factor. This may produce 4 correspondences.

FIG. 3A illustrates the rectification technique in this epipolar geometry. L1, R1 forms a first pair of epipolar lines with L2, R2 being the second pair of epipolar lines. Note that these lines, however, are not properly aligned, and cannot be aligned as shown. To align, a new line v1 is defined, which passes through the average of the y coordinates of the start and end points corresponding to beginning and end of L1 and beginning and end of R1. Another line v2 is similarly formed from L2, R2. These lines, v1 and v2 are aligned. Accordingly, this rectification transformation may map the non-aligning lines, L1-R1, L2-R2 to the aligned lines v1, v2. From the intersections of these lines at the vertical image edges, a rectification matrix can be computed for each image.

The software provided by "Zhang" is used for the fundamental matrix computation. See http://wwe-sop.inrld.fr/robotvis/demo/f-http/html/. Below, a brief explanation of why this technique works is provided.

First, recall from the above explanation section that a cross-ration between the two pencil-of-lines in the two image planes is unchanged, and that cross-ratio is invariant to homography.

Second, within each pencil, the line that is "at infinity" is the one that passes the image origin; this line possesses the canonical form [a, b, 0].

Third, after the rectification, all three bases are aligned—two of them form the top and bottom edges of the "trapeze", the special one mentioned above is mapped to the X-axis. This fact plus the invariant property of cross-ratio makes the alignment of the corresponding epipolar lines, or scanlines after rectification, useful.

Figure 4C:
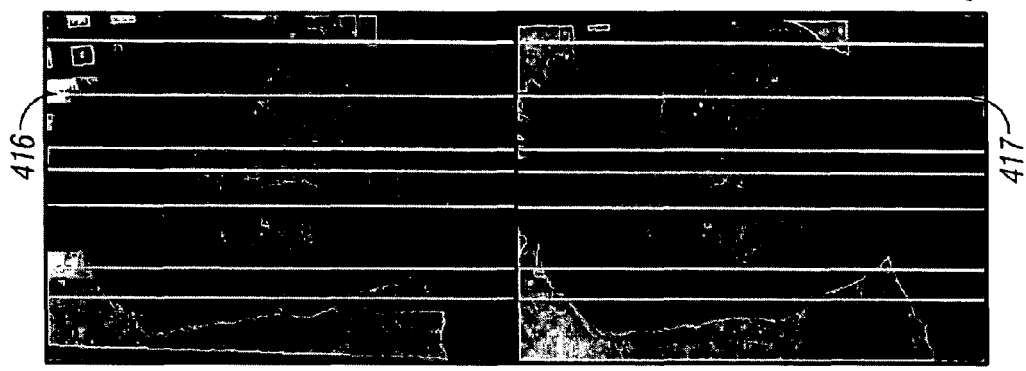
FIG. 4a–4c show operations on images.
Figure 4B:
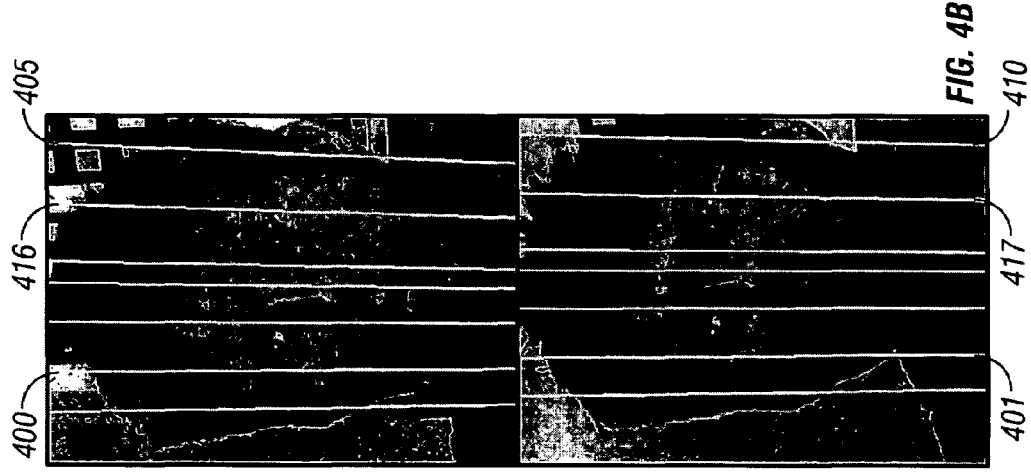
Figure 4A:
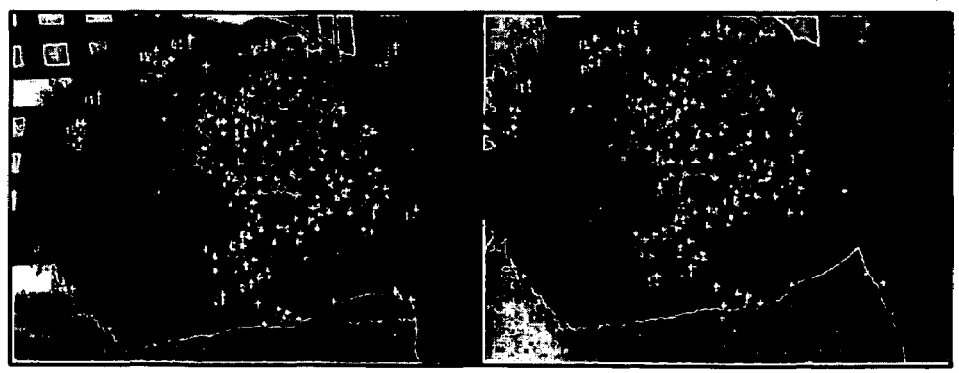

FIGS. 4A–4C shows a rectification process which operates to superimpose the epipolar lines. First matching points are automatically selected by Zhang's software. These are shown as points in FIG. 4A. In FIG. 4B, lines before extraction are shown. Consider for example line 400 and 401. Both of these lines pass through the same point through the user's eye in the two different images 405, 410. However, the lines 400, 401 do not line up in the two images. Similarly, other lines which pass through the same corresponding points in other images do not line up. Consider, for example, line 416 which passes through the right eye quarter in both images 405 and 410. This does not line up with the line 417 in image 405.

In order to align these images, the rectification transformation is carried out to produce the images shown in FIG. 4C. In these images, each of the lines line up. Specifically, the lines 416 lines up with 417, and 400 lines up with 401. Each of the other lines also aligns. Importantly, this all can be done based on information in the fundamental matrix.

This can be recovered from the eight pairs of point correspondences as described above. This can be recovered from the eight pairs of point correspondences as described above. The epipolar geometry is an output of Zhang's software. The rectification transformation matrix is calculated by the present system, in contrast, using only four pairs of correspondences.

By using this transformation, therefore, full camera calibration may be avoided, and instead the thus-obtained information can be used.

At 130, the aligned images are matched. Image matching has been typically formulated as a search optimization problem based on local similarity measurements. Global constraints may be enforced to resolve ambiguities, such as multiple matches. The correspondence information may be represented as disparity, d which may be conceptualized as the difference between the axial coordinates of the two matching pixels.

The disparity coordinate d may be a function of the pixel coordinates (u, v) of the images. Accordingly, d(u, v) may define a piecewise continuous surface over the domain of the image plane. This surface d(u, v) is referred to as this disparity surface.

Image matching can therefore be thought of as location of the disparity surface in abstract three-dimensional space. The output is the disparity map recording the disparity value d as a function of the pixels u, v.

The image matching in 130 embeds the disparity surface into a volume. Each voxel in the volume has a value proportional to the probability of the volume being on the disparity surface. Hence, the image matching is carried out by extremal surface extraction. Discrete surface patches may be found using volume rendering techniques.

Mathematically, image matching can be encoded as the correspondence information by a function d(u, v) defined over a first image plane (denoted as $I_1$) such that (u, v) and (u+d(u, v), v) become a pair of corresponding pixels. Geometrically, d(u, v) defines the disparity surface. Assuming corresponding pixels have similar intensities (color), and letting $\Phi$ denote a similarity function such that larger values mean more similar pixels, matching can be formulated as a variational problem:

$$D(u, v) = \max_{d(u,v)} \left( \int_{I_1} \int \Phi(u, v, d(u, v)) du dv \right). \quad (1)$$

One simple solution to (1) is to sample over all possible values of u, v, and d, followed by an exhaustive search in the resulting volume. However, it is desirable to do this "efficiently". There are two issues: one is efficiency—how to i.e. to perform the search in a time-efficient way; and robustly i.e. to avoid local extrema.

In the disclosed technique d(u, v) is treated geometrically as a surface in a volume instead of an algebraic function. The surface is extracted by propagating from seed voxels which have relatively high probability of being correct matches.

A normalized cross-correlation over a window as the similarity function:

$$\Phi(u, v, d) = \frac{Cov(W_l(u, v), W_r(u + d, v))}{Std(W_l(u, v)) \cdot Std(W_r(u + d, v))} \quad (2)$$

where $W_l$ and $W_r$ are the intensity vectors of the left and right windows of size W centered at (u, v) and (u+d, v) respectively, d is the disparity, "Cov" stands for covariance and "Std" for standard deviation. The width and height of the (left) image together with the range of d form the u-v-d volume. The range of $\Phi$ is [0–>1]. When $\Phi$ is close to 1, the two pixels are well correlated, hence have high probability of being a match. When $\Phi$ is close to −1, that probability is low. In implementation, a threshold needs to be set. We discuss how to choose its value in the next subsection.

The fact that $\Phi$ is a local maximum when (u, v, d) is a correct match means that the disparity surface is composed of voxels with peak correlation values. Matching two images is therefore equivalent to extracting the maximal surface from the volume. Since the u-v-d volume may be very noisy, simply applying the "Marching Cubes" algorithm might easily fall into the trap of local maxima. A special propagation technique is used along with the disparity gradient limit which states that $|\Delta d|/|\Delta u|<1$. Use of this constraint in the scanline direction is equivalent to the ordering constraint often used in scanline-based algorithms (e.g. by Cox et al.). Using it in the direction perpendicular to the scan lines enforces smoothness across scan lines, which is only partially enforced in inter-scanline based algorithms such as the one presented by Ohta and Kanade.

Figure 5:
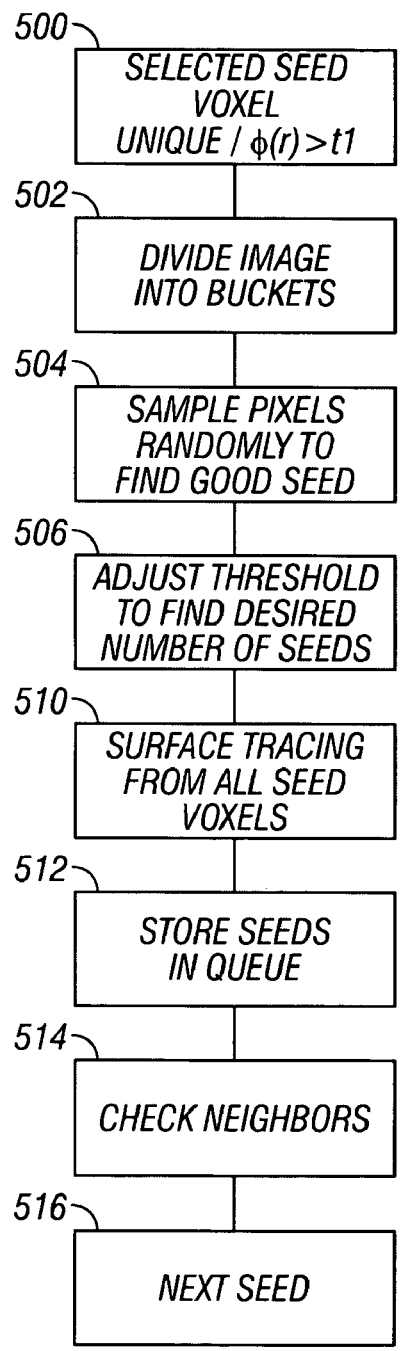
FIG. 5 shows a flowchart of operation.

The output from this matching algorithm is the disparity map which corresponds to the voxels that comprise the disparity surface. As can be appreciated this is different from volume rendering, or other matching methods that model the disparity surface as a continuous function. The technique is shown in the flowchart of FIG. 5.

First, at 500, a seed voxel is selected.

A voxel (u, v, d) is a seed voxel if, it is unique—meaning for the pixel (u, v), there is only one local maximum at d along the scanline v, and $\Phi$(u, v, d) is greater than a threshold t1.

A seed should reside on the disparity surface. Otherwise, the true surface point (u, v, d'), for which d'≠d, would be a second local maximum.

To find seeds, the image is divided into a number of parts or "buckets" at 502. Inside each bucket, pixels are checked randomly at 504 until either one seed is found, or all pixels have been searched without success. During the search, the voxel values may be cached to save computation time for subsequently operating the next step. The value of t1 determines the confidence of the seed points. It may be set close to 1. In specific experiments, we start from 0.995 trying to find at least 10 seeds at 506. If too few seeds are found, the value is decreased. In all the examples tried so far, we have found the range of t1 to be between 0.993 and 0.996; more generally, the t1 should be greater than 0.9, even greater than 0.99.

At 510, surface tracing is carried out at 510.

The disparity surface may be traced simultaneously from all seed voxels, by following the local maximal voxels whose correlation values are greater than a second threshold t2. The $|\Delta d|/|\Delta u|<1$ constraint determines that when moving to a neighboring voxel, only those at d, d−1, d+1 need to be checked. Initially, the seed voxels may be in a first in-first out (FIFO) queue at 512. After tracing starts, the head of the queue is exposed every time, and the 4-neighbors of the corresponding pixel are checked at 514. Border pixels need special treatment. When two surface fronts meet, the one with the greater correlation value prevails. If any new voxels are generated, they are pushed to the end of the queue. This process continues at 516 until the queue becomes empty.

To enforce smoothness, the voxel (u', v', d) may be assigned higher priority than (u', v', d−1) and (u', v', d+1). To obtain sub-pixel accuracy, a quadratic function is fitted at (u', v', d'−1), (u', v', d'), and (u', v', d'+1) where (u', v', d') is the newly-generated voxel. t2 determines the probability that the current voxel is on the same surface that is being traced; however the value of t2 may not be critical. In all the examples tried so far, the value 0.6 is used. Exemplary pseudo code of the tracing algorithm is given in Table 1.

TABLE 1

Pseudo code of the tracing algorithm

```
Algorithm 1. Disparity Surface Tracing
Initialize Q with the seed voxels;
While (not empty Q)
{
  Set (u, v, d) = pop Q;
  For each 4-neighbor of (u, v)
  {
    Call it (u', v');
    Choose among (u', v', d − 1), (u', v', d), (u', v', d + 1)
      the one with the max correlation value and call it (u', v', d');
    if (u', v') already has a disparity d"
      disparity(u', v') = Φ( u', v', d') > Φ
      (u', v', d") ? d': d";
    else if Φ(u', v', d') > t2
    {
      disparity(u', v') = d';
      push (u', v', d') to the end of Q;
    }
  }
}
```

The worst case complexity of the seed selection part is bounded by O(WHDW) where W and H are respectively the width and height of the image, D is the range of the disparity, and W is the size of the correlation window. The tracing part is bounded by O(WHW). Since some voxels have been already computed during initial seed voxel determination the first step, this limit WH may never be reached. Note that, in this case, it is expected to traverse the each image plane at least once. Thus the lower bound of the complexity is O(WH).

Seed selection may form a bottleneck in this extraction technique. To improve time efficiency, the algorithm may proceed in a multiscale fashion: only at the coarsest level is the full volume computed; at all subsequent levels, seeds are inherited from the previous level. To guarantee the existence of seeds at the coarsest level, the uniqueness condition that has been described in previous arrangements, is replaced by a winner-take-all strategy. That is, at each (u, v), we compute all voxels (u, v, d) where d∈[−$W_0$/2, $W_0$/2] and choose the one that has the maximum correlation value.

Under this relaxed condition, some seeds may represent incorrect matches. To deal with this, we assign the seeds randomly to five different layers. As a result, five disparity maps are generated at the end of tracing. This allows identifying and removing wrong matches. If no agreement can be reached, that point is left unmatched. At each level, extraction is performed for both the first and second images. Crosschecking is then conducted. Those pixels whose left and right disparities differ by more than one pixel are eliminated and recorded as unmatched. At the finest level, small holes are filled starting from the borders shows the final disparity map resulting from the improved algorithm. The execution time is reduced to about ⅙ of the previous version.

Assume the reduction rate between the two resolutions is 4 and the size of the correlation window is constant over all resolutions, the time complexity is reduced to O(WHS). Another merit of the multi-resolution version is that there is no need to prescribe a value for D.

The disparity map may then be manually edited at 135. This may allow the user to manually remove any information which appears out of place.

Shape inference is carried out at 140. The function of shape inference is to convert to the "dense" disparity map into a 3-D cluster of Euclidean points coordinates. Usually, the interest is in the shape appearance of the objects. Accordingly, this enables formation of a transformation to the final construction.

In the reconstruction stage, the correspondence information is transformed into 3-D Euclidean coordinates of the matched points. The operation carries out a two-step approach which includes projective reconstruction followed by Euclidean reconstruction.

The projective reconstruction may proceed by matrix factorization.

Kanade et al. has described a reconstruction algorithm using matrix factorization. The projections of n points may be considered in two views as $[u_{ij}, v_{ij}]^T$ where i=1,2 and j=1, . . . , n. The following measurement matrix is defined:

$$W = \begin{bmatrix} \begin{bmatrix} u_{11} \\ v_{11} \end{bmatrix} & \cdots & \begin{bmatrix} u_{1n} \\ v_{1n} \end{bmatrix} \\ \begin{bmatrix} u_{21} \\ v_{21} \end{bmatrix} & \cdots & \begin{bmatrix} u_{2n} \\ v_{2n} \end{bmatrix} \end{bmatrix}.$$

The authors observed that, under orthographic or paraperspective projection, the aforementioned matrix is of rank 3. Then, a rank-3-factoriztion of the measurement matrix gives the affine reconstruction. One advantage of their algorithm is that all points are used concurrently and uniformly.

In applying the idea to perspective projection models, Chen and Medioni show that the following modified measurement matrix is of rank 4:

$$W = \begin{bmatrix} \begin{bmatrix} u'_{11} \\ v'_{11} \\ 1 \end{bmatrix} & \cdots & \begin{bmatrix} u'_{1n} \\ v'_{1n} \\ 1 \end{bmatrix} \\ \begin{bmatrix} u'_{21} \\ v'_{21} \\ 1 \end{bmatrix} & \cdots & \begin{bmatrix} u'_{2n} \\ v'_{2n} \\ 1 \end{bmatrix} \end{bmatrix}$$

where each column denotes a pair of corresponding pixels after rectification. Thus a rank-4-factorization produces a projective reconstruction (section):

$$W = P_{6\times 4} \cdot Q_{4\times n} = \begin{bmatrix} P_1 \\ P_2 \end{bmatrix} [Q_1 \cdots Q_n], \quad (3)$$

where $P_1$ and $P_2$ are the 3×4 matrices of the two cameras, and $Q_i$'s are the homogeneous coordinates of the points. Such a factorization may be carried out using Singular Value Decomposition (SVD).

Next, the so-far obtained projective reconstruction is converted into the first canonical form which is a prerequisite of our Euclidean reconstruction algorithm.

Let $P_1=[P_{11}\ p_1]$. It is known that $C_1=-P_{11}^{-1}p_1$ is the first projection center. The stereo rig can be translated so that $C_1$ is coincident with the world origin. Let the translation matrix be $$B = \begin{bmatrix} I & -P_{11}^{-1}p_1 \\ 0 & 1 \end{bmatrix},$$

then $$P_1 B = [P_{11}\ p_1]\begin{bmatrix} I & -P_{11}^{-1}p_1 \\ 0 & 1 \end{bmatrix} = [P_{11}\ 0].$$

Thus $$W = \begin{bmatrix} P_1 \\ P_2 \end{bmatrix} BB^{-1}[Q_1\ \ldots\ Q_n] = \begin{bmatrix} P_{11} & 0 \\ P_{21} & p_2 \end{bmatrix}[Q_1'\ \ldots\ Q_n'] \quad (4)$$

is the desired canonical form for stereo projective reconstruction.

Now that the world coordinate system (the origin and the axes) is coincident with that of the first camera, Euclidean reconstruction is equivalent to finding the Projective Distortion Matrix H such that $$[P_{11}\ 0]H=[A_1\ 0]I, \quad (5a)$$

and $$[P_{21}\ p_2]H = \mu[A_2\ 0]\begin{bmatrix} R & T \\ 0 & 1 \end{bmatrix} \quad (5b)$$

where $\mu$ compensates for the relative scaling between the two equations and A1 and A2 are diagonal matrices consisting focal length of the two cameras:

$$A_1 = \begin{bmatrix} f_1 & 0 & 0 \\ 0 & f_1 & 0 \\ 0 & 0 & 1 \end{bmatrix},\ A_2 = \begin{bmatrix} f_2 & 0 & 0 \\ 0 & f_2 & 0 \\ 0 & 0 & 1 \end{bmatrix}.$$

Since H is defined up to a scale factor, we set one of its elements to be 1:

$$H = \begin{bmatrix} H_1 & h_1 \\ h^T & 1 \end{bmatrix}.$$

Then, (5a) becomes, $$[P_{11}\ 0]\begin{bmatrix} H_1 & h_1 \\ h^T & 1 \end{bmatrix} = [P_{11}H_1\ P_{11}h_1] = [A_1\ 0]$$

which implies $h_1=0$ and $H_1=P_{11}^{-1}A_1$. Thus $$H = \begin{bmatrix} P_{11}^{-1}A_1 & 0 \\ h^T & 1 \end{bmatrix}. \quad (6)$$

Plug (6) into (5b), $$[P_{21}\ p_2]\begin{bmatrix} P_{11}^{-1}A_1 & 0 \\ h^T & 1 \end{bmatrix} = [P_{21}P_{11}^{-1}A_2+p_2h^T\ p_2] = \mu[A_2R\ A_2T]$$

which generates $$P_{21}P_{11}^{-1}A_1+p_2h^T = \mu A_2 R = \mu\begin{bmatrix} f_2 R_1 \\ f_2 R_2 \\ R_3 \end{bmatrix} = \begin{bmatrix} M_1 \\ M_2 \\ M_3 \end{bmatrix} \quad (7a)$$

and $$p_2=\mu A_2 T. \quad (7b)$$

Since R is a rotation matrix, (7a) further expands into the following 5 constraints on $f_1$, $f_2$, and h:

$$M_1 \cdot M_2 = M_2 \cdot M_3 = M_3 \cdot M_1 = 0, \quad (8a)$$

$$\|M_1\|=\|M_2\|=f_2\|M_3\|, \quad (8b)$$

Once $f_1$, $f_2$, and h are computed, H can be obtained from (6). R, T and $\mu$ are obtained from (4.7). To determine the initial value for H, let $R\approx I$, $\mu\approx 1$, and $$A_1 \approx A_2 = \begin{bmatrix} f & 0 & 0 \\ 0 & f & 0 \\ 0 & 0 & 1 \end{bmatrix} = A,$$

since the two cameras have similar orientation and focal length. It follows that $$H_1 = P_{11}^{-1}A \text{ and } p_2 h^T = (I-P_{21}P_{11}^{-1})A.$$

Thus, an approximate Euclidean reconstruction can be achieved solely depending on f. We have developed an interactive tool to let the user input f, and adjust its value until the approximation looks reasonable.

Initial work on this invention has carried out its operation on faces. Faces may be difficult to reconstruct due to their smooth shape, and relative lack of prominent features. Moreover, faces may have many applications including teleconferencing and animation.

Other embodiments are within the disclosed invention.

What is claimed is:

1. A method, comprising:
   obtaining two images of similar image information from two uncalibrated sources;
   superimposing lines formed on said images to rectify the two images relative to one another to form rectified images;

using said rectified images to form three-dimensional information by forming a disparity map of three dimensional information for specified coordinates of matching pixels;

wherein said using comprises forming a three-dimensional surface indicative of three-dimensional information contained in said two images, and forming a variable which indicates a likelihood of error in said three-dimensional surface; and wherein said forming a variable comprises forming a plurality of seed voxels which have a probability of being correct greater than a specified amount which makes it unlikely that the voxels will not be correct, and tracing a surface from said plurality of seed voxels.

2. A method as in claim 1, wherein said tracing is carried out for a plurality of said voxels in a multiresolution fashion, such that certain voxels are computed at a coarsest level, and other voxels are computed at a more detailed level.

3. A method as in claim 1, wherein said tracing comprises calculating an entire volume at the coarsest level, and calculating some amount less than the entire volume at a subsequent level.

4. A method as in claim 1, further comprising selecting a seed voxel by finding uniqueness.

5. A method as in claim 1, further comprising selecting the seed voxel using a winner take all technique which has a maximum correlation value.

6. A method as in claim 5, further comprising identifying seed voxels which represent incorrect matches, and removing said seeds after said tracing.

7. A method as in claim 1, wherein said converting comprises projecting a reconstruction of said volume, and then reconstructing Euclidean points from said projective reconstruction.

8. A method as in claim 1, wherein said converting comprises transforming an origin of a coordinate system to an origin of one of said images.

9. A method as in claim 7, wherein said reconstructing comprises allowing a user to input a parameter, and adjust the parameter to approximate a proper Euclidean reconstruction.

10. A method as in claim 9 wherein said parameter is focal length.

11. A method as in claim 1, further comprising dividing said surface into a plurality of parts, and said seed voxels are respectively for said plurality of parts.

12. A method comprising:
obtaining first and second images of the same object;
identifying objects in said first and second images, and forming lines which intersect said objects;
aligning said lines in an epipolar geometry representation;
using said first and second images, with said aligned lines, to form three-dimensional information;
identifying at least one seed voxel, with a relatively high probability of being a correct three-dimensional measure; and
forming at least a part of said surface map by propagating from said seed voxel.

13. A method as in claim 12, wherein said identifying at least one seed voxel comprises selecting a seed voxel that has three-dimensional information for corresponding pixel information u, v that is unique and has a probability of being correct which is greater than a specified threshold.

14. A method as in claim 12, further comprising identifying a plurality of seed voxels for each of a plurality of different parts of the three-dimensional surface information.

15. A method as in claim 13, wherein said specified threshold is greater than 0.99.

16. A method as in claim 14, further comprising determining intersections between voxels at said different parts, and determining which of two voxels to use at said intersections.

17. A method as in claim 16, wherein said determining which voxels to use comprises determining a probability of each of the two voxels, and selecting the higher probability as the voxel to use.

18. A method as in claim 14, wherein said propagating comprises finding neighbors for voxels, one by one.

19. A method as in claim 12, wherein said identifying at least one seed voxel comprises selecting a seed voxel that has three-dimensional information for corresponding pixel information that best matches the corresponding pixel information, and has a probability of being correct which is greater than a specified threshold.

20. A method as in claim 19, further comprising identifying voxels which represent incorrect matches, and removing said voxels which represent incorrect matches.

21. A method comprising:
obtaining first and second images of the same object;
identifying objects in said first and second images, and forming lines which intersect said objects; and
aligning said lines in an epipolar geometry representation
further comprising using said first and second images, with said aligned lines, to form three-dimensional information;
wherein said three-dimensional information includes a disparity map, and further comprising converting said disparity map into three-dimensional Euclidean points; and
wherein said using is carried out for a plurality of said images in a multiresolution fashion, such that certain image information is computed at a coarsest level, and other image information is computed at a more detailed level.

22. A method, comprising:
obtaining information about an image from two uncalibrated cameras;
using said information from said two uncalibrated cameras to obtain three-dimensional information;
wherein said using comprises rectifying said images to form coplanar images with scan lines that are horizontally parallel;
finding an average of said scan lines between one end of a first image and another end of a second image, and reforming said scan lines between said one end and another end to form said horizontally parallel scan lines;
using said information to form a disparity surface which represents three-dimensional information corresponding to each of said two-dimensional points;
wherein said using comprises forming a three-dimensional surface indicative of three-dimensional information contained in said two images, and forming a variable which indicates a likelihood of error in said three-dimensional surface; and
wherein said forming a disparity surface comprises forming a plurality of seed voxels, and tracing a surface of said plurality of seed voxels.

23. A method, comprising:
obtaining information about an image from two uncalibrated cameras;
using said information from said two uncalibrated cameras to obtain three-dimensional information;

wherein said using comprises rectifying said images to form coplanar images with scan lines that are horizontally parallel;

further comprising using information from said rectified images to form third dimension information associated with each of said two-dimensional points of said image;

wherein said using comprises forming a three-dimensional surface indicative of three-dimensional information contained in said two images, and forming a variable which indicates a likelihood of error in said three-dimensional surface and tracing a surface defined by a plurality of seed voxels which have a low likelihood of error.

24. A method as in claim 23, wherein said third dimensional information includes a probability that the third dimensional information is correct.

25. A method as in claim 23, further comprising dividing the image into a plurality of patches, and finding said third dimensional information for each of said plurality of patches.

26. A method as in claim 25, further comprising determining third dimensional information for pixels on edges of said patches.

27. A method as in claim 23, wherein said using comprises converting said volume to a plurality of Euclidean points.

28. A method, comprising:

obtaining two images of similar image content;

forming a disparity map of three dimensional information for specified coordinates of matching pixels by forming a plurality of areas, finding seed voxels in each of said plurality of areas which have relatively high probability of being correct matches and propagating to other pixels from said seed voxels; wherein said propagating comprises forming a surface in a volume as said disparity surface; and wherein said surface is continuous in the space (x, y, d) where x and y are the coordinates of the pixel, and d is the amount of disparity of the pixel.

29. A method as in claim 28, wherein said finding seed voxels comprises reviewing each said section, and finding a voxel with a peak correlation value in each said section as said seed voxel.

30. A method as in claim 28, wherein said finding seed voxels comprises reviewing each said section, and finding a first found voxel with a correlation value greater than a specified threshold in each said section as said seed voxel.

31. A method as in claim 28, further comprising calculating first information at a first resolution for said seed voxels, and calculating second information, at a second resolution less than said first resolution, for other voxels other than said seed voxels.

32. A method, comprising:

obtaining two images of similar image content;

forming a disparity map of three dimensional information for specified coordinates of matching pixels by forming a plurality of areas, finding first information in each of said plurality of areas which have relatively high probability of being correct matches and obtaining said first information at a first resolution, and propagating along a surface to obtain second information at a second resolution less than said first resolution.

33. A method as in claim 32, wherein said two images are from two separate image sources.

34. A method as in claim 32, wherein said first information is seed information.

35. A method as in claim 32, wherein said seed information is obtained by a winner-take-all test, where, at each pixel (u, v), all voxels (u, v, d) where $d \hat{I} [-W0/2, W0/2]$ are computed, and a voxel with a maximum correlation value is used.

* * * * *